May 22, 1956 R. A. AMMON 2,746,635
SEALED INSTRUMENT CASE
Filed Aug. 11, 1953
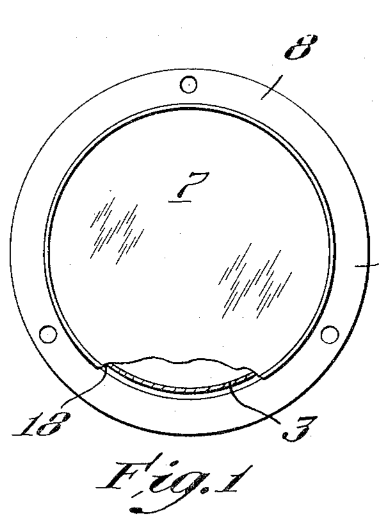
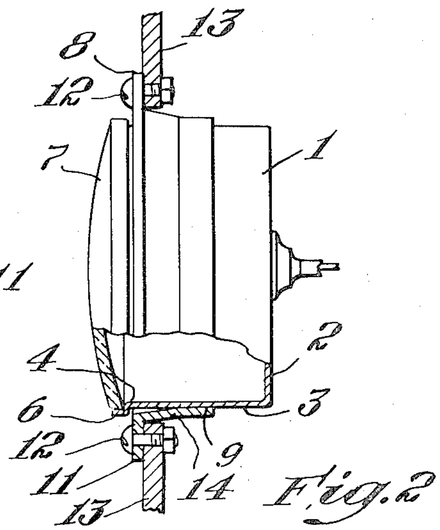
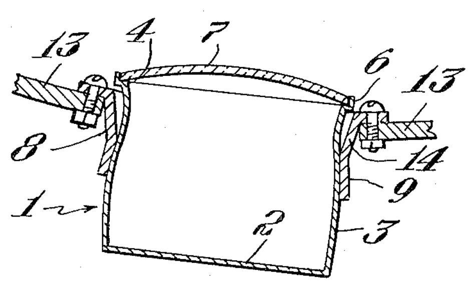
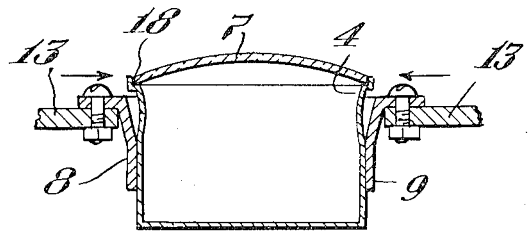
Inventor
Roscoe A. Ammon
by Roberts, Cushman & Grover
att'ys.

United States Patent Office 2,746,635

Patented May 22, 1956

2,746,635

SEALED INSTRUMENT CASE

Roscoe A. Ammon, Manchester, N. H.

Application August 11, 1953, Serial No. 373,525

3 Claims. (Cl. 220—18)

The present invention relates to sealed instrument cases, particularly metal meter cases having a glass window which forms a closure sealing the case from the atmosphere.

Cases of the above type have been customarily assembled by metallizing the edge of the glass window and soldering the metallized edge to a metal instrument housing, the window edge being located adjacent a flange on the housing used to mount the housing in an instrument panel. With such an assembly the seal and the glass window are subject to rupture if the casing is deformed by mechanical stress or shock imparted by twisting of the panel in which the meter is mounted. Similar failures result from stress due to thermal shock.

It has been proposed to interpose a bellows between the glass window and the housing. However, such a structure requires two seals and greatly adds to the expense and difficulty of manufacture.

Accordingly one object of the present invention is to provide a simple, inexpensively manufactured case involving only one glass to metal seal, which isolates the glass and seal from mechanical and thermal shock or stress. Another object is to provide a casing which is reduced in weight without sacrifice of durability.

In a broad aspect the case comprises a metal housing, preferably of thin metal, having an end wall and a tubular side wall forming an opening opposite said end wall, a transparent window for the case, a seal between the window and the opening, and a relatively stiff annular mounting bracket secured to the outside of the housing at a location spaced from the aforesaid opening so as to isolate the window from compression forces, said housing wall between said location and opening being flexible thereby to isolate the window and seal from twisting forces. Preferably the bracket comprises a portion secured to the housing, a flange for attaching the bracket to a panel and an intermediate portion between the first said portion and the flange, the intermediate portion being spaced from the housing.

More specifically the housing opening comprises an abutment which engages the aforesaid window edgewise and the housing wall between the abutment and the portion at which the bracket is secured is flexible substantially at right angles to the edges of the window.

For the purpose of illustration a typical embodiment is shown in the accompanying drawing in which:

Fig. 1 is an elevation of the face of a meter case;

Fig. 2 is a side elevation of the meter case, parts being shown in section; and

Figs. 3 and 4 are sectional views of the case.

As shown in the drawings, the case comprises a housing 1 of thin, flexible metal including an end wall 2 and a side wall 3. The side wall 3 forms an annular opening 4 including an abutment 6. A circular window 7 having metallized edges 18 is soldered at the opening 4 of the housing 1 with the abutment 6 confining the edges of the window. Since the side wall 3 and end wall 2 are integral the seal at the edges 18 of the window 7 completely closes the casing and protects the instrument therein from adverse influences of the atmosphere.

An annular bracket 8 is secured by a mounting portion 9 at a location spaced from the opening 4 of the housing 1. The bracket 8 has a flange 11 for attachment, as by screws 12, to an instrument mounting panel 13. Intermediate the flange 11 and the mounting portion 9 is a connecting portion 14 inclined away from the side wall 3 of the housing 1.

As shown in Fig. 3 the flexible side walls 3 of the housing 1 isolate the window 7 and the abutment 6 at which the seal is formed from twisting stresses applied to the mounting bracket 8 due to bending of the instrument panel 13. The bracket 8 is formed of much thicker stock than the housing wall 3 and resists flexing and compressing forces. However, the bracket forms a small part of the total bulk of the meter and thus does not appreciably add to its total weight. Such stresses as are not absorbed by the bracket 8 are transmitted to the housing 1 at the mounting portion 9 spaced from the opening 4. The portion of the housing wall 3 between the mounting portion 9 of the bracket and the opening may flex so that stresses are not applied directly to the seal between the glass window 7 and the abutment 6. Consequently the seal and window are isolated from twisting forces which may result from warping of the instrument panel or improper mounting of the bracket therein.

Similarly the seal and window 7 are isolated from compression forces due to thermal shock as indicated by the arrows in Fig. 4. Such compression as is not absorbed by the bracket 8 is applied to the casing at the mounting portion 9 which is isolated by the flexible wall 3 from the seal and window.

Despite its ability to absorb various stresses and shock without rupture of the seal or glass window, the present meter casing may be very economically manufactured from pressed metal parts and requires only one sealing process to secure the window to the housing.

While I have shown one embodiment of the invention for the purpose of illustration, it should be understood that the present disclosure is for illustration only and that this invention includes all modifications and equivalents which fall within the scope of the appended claims.

I claim:

1. A sealed instrument case comprising a metal housing having an end wall and a tubular side wall forming an opening opposite said end wall, a transparent window, a seal between said window and said opening, and a relatively stiff annular mounting bracket secured to the outside of said housing at a location spaced from said opening to isolate said window and seal from compression forces, said bracket having a mounting portion for attaching the bracket to a support and an intermediate portion between the first said portion and said mounting portion, said intermediate portion being radially spaced from said housing, and said housing wall between said location and opening being flexible to isolate said window seal from twisting forces.

2. A sealed instrument case comprising a metal housing having an end wall and a tubular side wall forming an opening opposite said end wall, a transparent window, a seal between said window and said opening, and a relatively stiff annular mounting bracket, having a portion secured to the outside of said housing at a location spaced from said opening to isolate said window and seal from compression forces, said bracket also having a flange for attaching the bracket to a panel and an intermediate portion between the first said portion and said flange, said intermediate portion being spaced radially from said housing, and said housing wall between said location and opening being flexible to isolate said window and seal from twisting forces.

3. A sealed instrument case comprising a thin metal housing having an end wall and an integral tubular side wall forming an opening opposite said end wall, a transparent window, said opening including an abutment engaging the window edgewise, a metallic seal between said window and said abutment, and a relatively thick and stiff annular metal mounting bracket having a portion secured to the outside of said housing at a location spaced from said opening to isolate said abutment, window and seal from edgewise compression forces, said bracket also having a flange for attaching the bracket to a panel and an intermediate portion between the first said portion and said flange, said intermediate portion being spaced from said housing, and said housing wall between said location and opening being flexible to isolate said window and seal from twisting forces.

References Cited in the file of this patent

UNITED STATES PATENTS

| | | |
|---|---|---|
| 1,474,173 | Scott | Nov. 13, 1923 |
| 2,056,917 | Booth | Oct. 6, 1936 |
| 2,143,517 | Huff | Jan. 10, 1939 |
| 2,329,158 | Gill | Sept. 7, 1943 |
| 2,440,260 | Gall | Apr. 27, 1948 |
| 2,494,669 | Nodine | Jan. 17, 1950 |
| 2,654,070 | Lamb | Sept. 29, 1953 |